(12) United States Patent
Gu et al.

(10) Patent No.: US 7,006,568 B1
(45) Date of Patent: Feb. 28, 2006

(54) 3D WAVELET BASED VIDEO CODEC WITH HUMAN PERCEPTUAL MODEL

(75) Inventors: Junfeng Gu, Austin, TX (US); Yimin Jiang, Rockville, MD (US); John S. Baras, Potomac, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 09/979,930

(22) PCT Filed: May 26, 2000

(86) PCT No.: PCT/US00/14552

§ 371 (c)(1),
(2), (4) Date: Nov. 27, 2001

(87) PCT Pub. No.: WO00/74385

PCT Pub. Date: Dec. 7, 2000

Related U.S. Application Data

(60) Provisional application No. 60/136,633, filed on May 27, 1999.

(51) Int. Cl.
*H04B 1/66* (2006.01)

(52) U.S. Cl. .............................. 375/240.11; 375/240.21; 375/240.03; 375/240.26; 375/240.24; 375/244; 386/112; 348/472; 382/239; 382/240; 382/251

(58) Field of Classification Search .......... 375/240.11, 375/240.21, 240.03, 240.26, 240.24, 244; 386/112; 348/472; 382/239, 240, 251
See application file for complete search history.

(56) References Cited

U.S. PATENT DOCUMENTS

| | | | | |
|---|---|---|---|---|
| 5,241,382 A | * | 8/1993 | Paik et al. | 375/240.25 |
| 5,822,493 A | * | 10/1998 | Uehara et al. | 386/109 |
| 6,211,919 B1 | * | 4/2001 | Zink et al. | 348/473 |

* cited by examiner

*Primary Examiner*—Shawn S. An
(74) *Attorney, Agent, or Firm*—Sterne, Kessler, Goldstein & Fox P.L.L.C

(57) ABSTRACT

A video encoding/decoding system based on 3D wavelet decomposition and the human perceptual model is implemented. JND is applied in quantizer design to improve the subjective quality of compressed video. The 3D wavelet decomposition helps to remove spatial and temporal redundancy and provides scalability of video quality. In order to conceal the errors that may, occur under bad wireless channel conditions, a slicing method and a joint source channel coding scenario, that combines RCPC with CRC and utilizes the distortion information to allocate convolutional coding rates are proposed. A new subjective quality index based on JND is presented and used to evaluate the overall system performance at different signal to noise rations (SNR) and at different compression ratios. Due to the wide use of arithmetic coding (AC) in data compression, it is considered as a readily available unit in the video codec system for broadcasting. A new scheme for conditional access (CA) sub-system is designed based on the compression graphic property of arithmetic coding. Its performance is analyzed along with its application in a multi-resolution video compression system. This scheme simplifies the conditional access sub-system and provides satisfactory system reliability.

15 Claims, 12 Drawing Sheets

Routine for determining if a scene cut has occurred

Routine for determining if drastic motion is occurring

Quantization Routine

Conditional Access Slicing and Encoding Routine

High Frequency Subband Slicing and Encoding Routine

Perceptual Channel Coding Routine

Video Decoding Routine

| l | $D_l$ | l | $D_l$ | l | $D_l$ |
|---|---|---|---|---|---|
| 0 | 4.5 | 4 | 7.5 | 8 | 27.6 |
| 1 | 7.6 | 5 | 7.5 | 9 | 27.6 |
| 2 | 7.6 | 6 | 8.7 | 10 | 42.8 |
| 3 | 8.8 | 7 | 7.4 | | |

Table 1 Average Distortion $D_l$ for Each Subband

From simulation we can see that $D_l$ divides $S_l$ into four categories, $\{S_0\}$, $\{S_1, S_2, S_3, S_4, S_5, S_7\}$, $\{S_6, S_8\}$, $\{S_{10}\}$, which is intuitive for subband coding.

FIG. 15

3D WAVELET BASED VIDEO CODEC WITH HUMAN PERCEPTUAL MODEL

CROSS-REFERENCE TO RELATED APPLICATION

This application claims the benefit of U.S. Provisional Application No. 60/136,633, filed May 27, 1999 (incorporated in its entirety herein by reference).

STATEMENT AS TO RIGHTS TO INVENTION MADE UNDER FEDERALLY-SPONSORED RESEARCH AND DEVELOPMENT

Part of the work performed during development of this invention utilized U.S. Government funds. The U.S. Government may have certain rights in this invention.

BACKGROUND OF THE INVENTION

1. Field of the Invention

The present invention relates generally to the compression and encryption of data, and more particularly to compressing data with a human perceptual model.

2. Related Art

Computer applications, audio devices, and video devices based on digital data technology continue to appear in the marketplace. In response, the need for presenting audio and video signals in digital form continues to increase. In the video broadcasting area, conventional video broadcast systems include cable television systems and satellite-based broadcast systems. Although the scale and power of such systems continue to increase, the overall bandwidth available for transmitting video and audio signals remains limited. Thus, the need for signal compression remains central to digital communication and signal-storage technology. Competing with the need to compress data is the need to maintain the subjective visual quality of an image, arguably, the ultimate objective of video transmission systems. To this end, performance metrics that take the psycho visual properties of the human visual system (HVS) into account are needed. Visual sensitivity to: frequency, brightness, texture, and color are examples of psycho-visual properties. A few human visual models incorporating these psycho-visual properties into their algorithms include: just-noticeable-distortion (JND), visible difference predictor (VDP) and three-component image model. The JND model for example, provides each pixel with a threshold of error visibility, below which reconstruction errors are rendered imperceptible.

To balance these considerations, one problem to be solved for optimizing the delivery of digital data streams is how to locate perceptually important signals in each frequency subband. A second problem is how to encode these signals with the lowest possible bit rate without exceeding the error visibility threshold.

A third consideration in the video broadcasting industry is the need to maintain conditional access to the transmitted data. In a commercial setting, conditional access is used to control which customer can get particular program services. Specific programs are only accessible to customers who have satisfied prepayment requirements. Conditional access is often implemented by way of a key-based system involving a combination of scrambling and encryption to prevent unauthorized reception. Encryption is the process of masking the secret keys that enable the descrambler to unscramble transmitted signals into viewable scenes. The integrity of the various encryption routines used presently is constantly being tested. As a result, vulnerabilities are identified and the push to develop improved systems continues. In view of the considerations set forth above, what is presently needed is a secure system that effectively meets the need to provide high quality images while making efficient use of limited bandwidths.

SUMMARY OF THE INVENTION

The invention described herein is a system and method for compressing and encrypting data. In an embodiment, video images are transformed into compressed and encrypted bitstreams. The bitstreams are then transmitted over a satellite broadcast channel to a receiving station where they are decoded and presented.

The system has a human visual model based encoder for receiving frames of video data. The human visual model based encoder is also responsible for transforming the video data into compressed and encrypted bitstreams. The internal components of the human visual model based encoder include a frame counter for recording the number of video frames received. A motion detector is included for analyzing the video frames for an indication that motion is occurring. A 3-D wavelet analyzer module is used to generate low and high frequency subbands. A just-noticeable distortion model generator is used to calculate a profile of the video image based upon local signal properties. A perceptually tuned quantizer provides a quantization for the wavelet coefficients present in each of the high and low frequency subbands. A differential pulse code modulator is used to provide prediction error calculations for the low frequency subbands. A slicer segments the subbands into smaller bitstreams so the influence of error from one bitstream to another is reduced. An entropy encoder is used to encode the high frequency subbands. Finally, a conditional access system is included for encoding the low frequency subbands in cases where authorization is required to decode the video images. Although the conditional access system is described as being located within the human visual based encoder, it is able to operate independent of the encoder.

The conditional access system has a random slicer which is used for segmenting the low frequency subbands and generating key values representing the starting positions for each of the segments. An encryption module is used to encode the key values generated by the random slicer. A subscriber authorization module provides authorization codes used to verify that the transmitted image signal is being decoded by an authorized party. An entropy encoder is used to perform additional encoding of the low frequency subbands in preparation for transmission over a broadcast channel.

The video transmission system also includes an unequal error protection channel encoder to further encode the bitstreams prior to broadcasting them over a satellite channel. On the receiving end, an unequal error protection channel over the satellite channel. A human visual model based decoder is then used to further decode the bitstreams and regenerate the frames of video data. The internal components of human visual model based decoder include a decoder for performing arithmetic decoding of encoded video bitstreams. The decoder also transforms the video bitstreams into slices of wavelet coefficients. An error detector is responsible for recognizing corrupted video slices. A concealment module is provided to discard any corrupted video slices identified by the error detector. An inverse quantizer is used to reverse the quantization results of the video slices. Finally, a 3-D wavelet synthesizer is provided to enable transformation of the slices into video frames.

In one embodiment, the method for compressing video frames includes arranging two successively received video frames into a set, decomposing said set into a plurality of high frequency and low frequency subbands; generating a human perceptual model for each of said plurality of subbands, encoding said low frequency subbands to produce encoded low frequency subbands, quantizing said high frequency subbands and said encoded low frequency subbands according to said generated human perceptual models to generate a bitstream for each of said high frequency subbands and a bitstream for each of said encoded low frequency subbands, redefining said generated bitstreams for each of said high frequency subbands to produce a plurality of redefined high frequency bitstreams, redefining said generated bitstreams for each of said encoded low frequency subbands to produce a plurality of redefined low frequency bitstreams, channel coding said plurality of redefined high frequency bitstreams and said plurality of redefined low frequency bitstreams, and repeating steps the above steps for a next set of video frames until each of said received video frames have been compressed.

BRIEF DESCRIPTION OF THE FIGURES

FIG. 15 is an example of subbands arranged into categories according to an embodiment of the present invention.

DETAILED DESCRIPTION OF THE PREFERRED EMBODIMENTS

Physical Design for the System of the Present Invention

Figure 1:
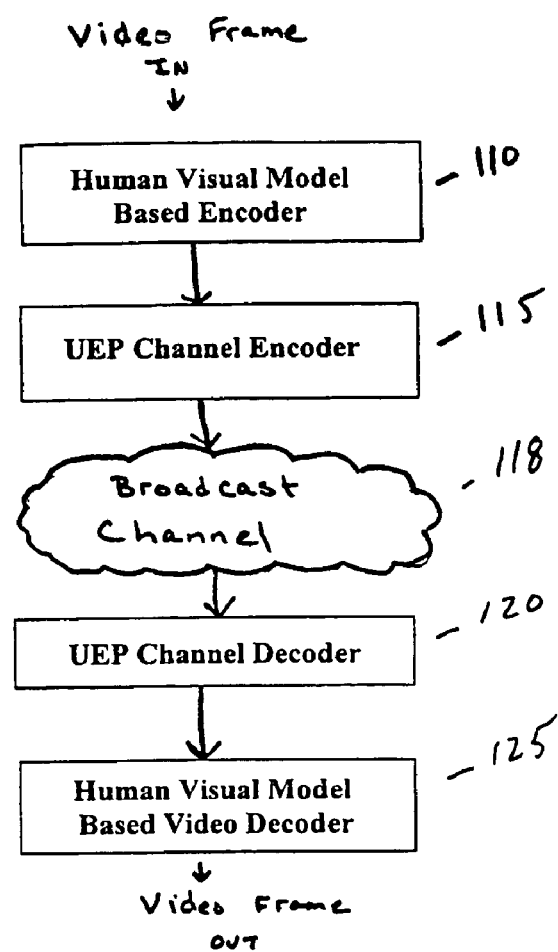
FIG. 1 is a block diagram illustration of a human perception model based video transmission system according to an embodiment of the present invention.

A system according to an embodiment of the present invention is illustrated in FIG. 1. System 100 shows a human visual model based encoder 110 for receiving frames of video data. Human visual model based encoder 110 is further responsible for transforming the video data into compressed and encrypted bitstreams. An unequal error protection channel encoder 115 is used to further encode the bitstreams prior to broadcasting them over a broadcast channel 118. An unequal error protection channel decoder 120 is provided for decoding the bitstreams after they have been transmitted over the satellite channel. A human visual model based decoder 125 is provided to further decode the bitstreams and regenerate the frames of video data.

Figure 2:
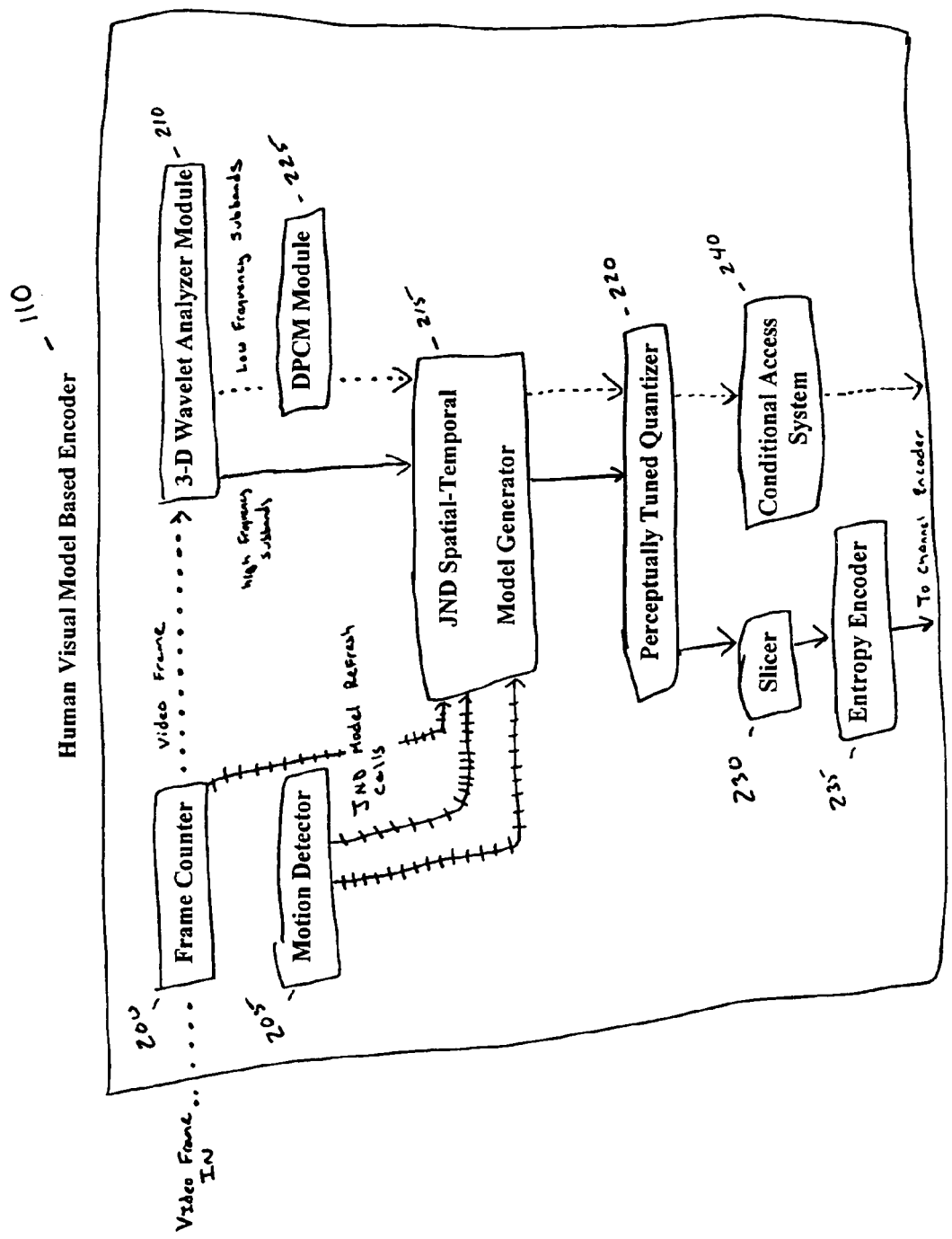
FIG. 2 is a block diagram illustration of a human visual model based encoder according to an embodiment of the present invention.

FIG. 2 shows the internal components of human visual model based encoder 110. A frame counter 200 is provided for recording the number of video frames received. A motion detector 205 analyzes the video frames for an indication that motion is occurring. A 3-D wavelet analyzer module 210 is used to generate low and high frequency subbands from the received video frames. A just-noticeable distortion model generator 215 is used to calculate a profile of the video image based upon local signal properties. A perceptually tuned quantizer 220 provides a quantization for the wavelet coefficients present in each of the high and low frequency subbands. A differential pulse code modulator 225 is use to provide prediction error calculations for the low frequency subbands. A slicer 230 segments the subbands into smaller bitstreams so the influence of error from one bitstream to another is reduced. An entropy encoder 235 is used to encode the high frequency subbands. A conditional access system 240 is included for further encoding of the low frequency subbands in cases where authorization is required to decode the video images.

Figure 3:
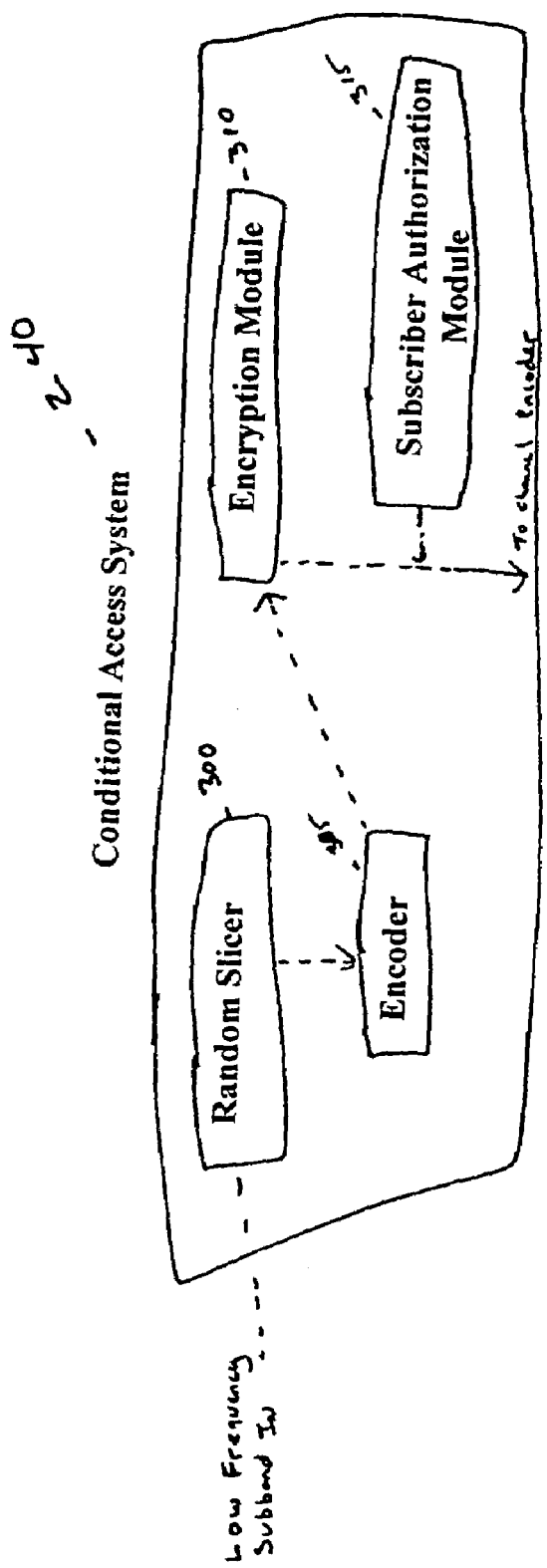
FIG. 3 is a block diagram illustration of a conditional access system according to an embodiment of the present invention.

Referring to FIG. 3, Conditional access system 240 has a random slicer 300 which is used for segmenting the low frequency subbands and generating key values representing the starting positions for each of the segments. Entropy encoder 305 is used to perform encoding of the low frequency subbands in preparation for transmission over a broadcast channel. Encryption module 310 is used to encode the key values generated by random slicer 300. Subscriber Authorization module 315 provides authorization codes used to verify that the transmitted image signal is being decoded by an authorized party. In an alternative embodiment, conditional access system 240 is able to operate independent of System 100.

Figure 4:
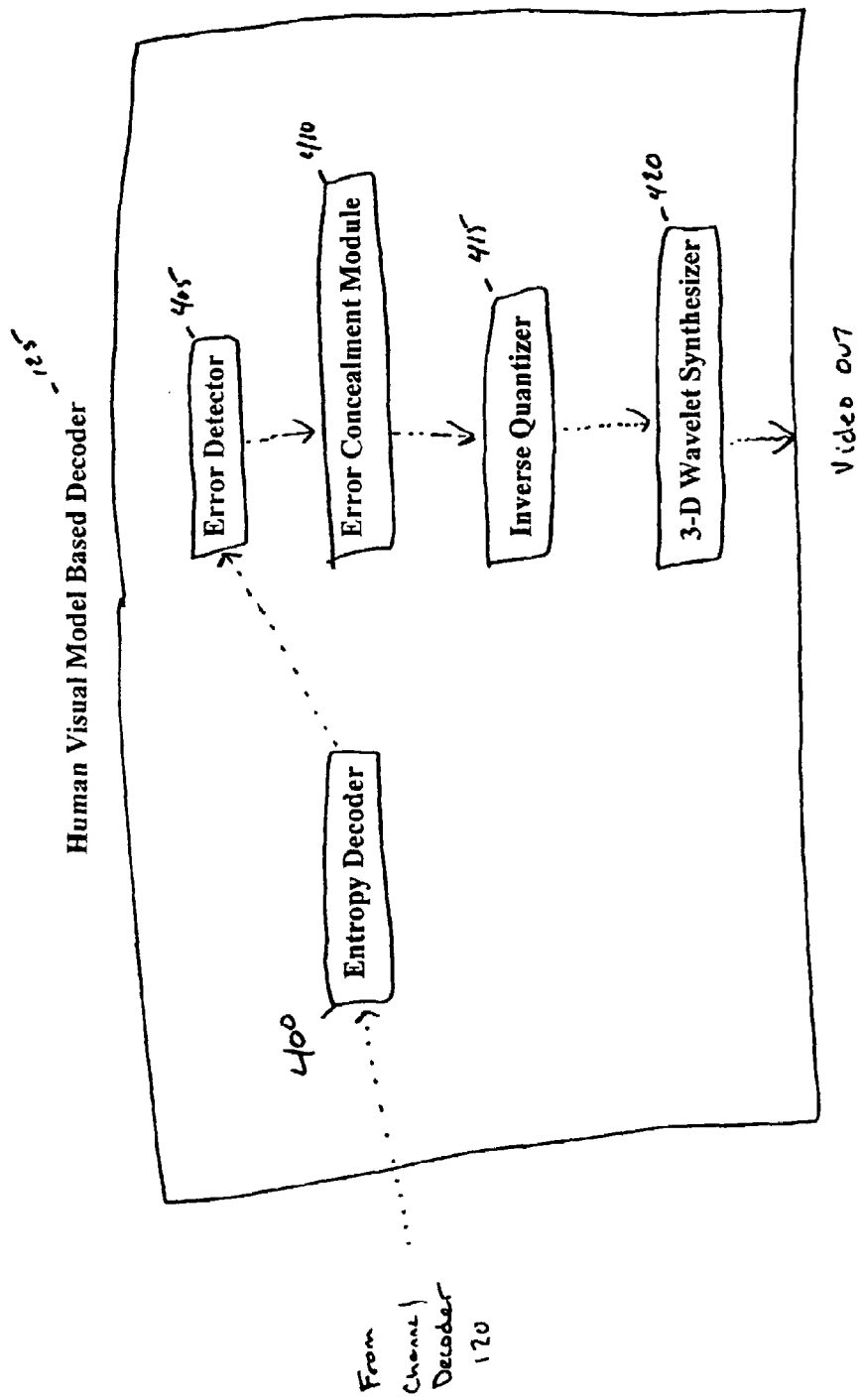
FIG. 4 is a block diagram illustration of a human visual model based decoder according to an embodiment of the present invention.

The internal components of human visual model based decoder 125 are described with respect to FIG. 4. Human visual model based decoder 125 includes a decoder 400 for performing arithmetic decoding of encoded video bitstreams. Decoder 400 also transforms the video bitstreams into slices of wavelet coefficients. Error detector 405 is responsible for recognizing corrupted video slices. Concealment module 410 is used to discard any corrupted video slices identified by Error detector 405. Inverse quantizer 415 is used to reverse the quantization results of the video slices. Finally, a 3-D wavelet synthesizer 420 is provided to enable transformation of the slices into video frames.

The operation of System 100 is described with respect to FIGS. 5–15. However, it is helpful to begin with a discussion of human perceptual modeling and just-noticeable distortion (JND) as they relate to the present invention.

The Human Perceptual Model of JND and Perceptual Coding

Human Perceptual Models

A biologically correct and complete model of the human perceptual system would incorporate descriptions of several physical phenomena including peripheral as well as higher level effects, feedback from higher to lower levels in perception, interactions between audio and visual channels, as well as elaborate descriptions of time-frequency processing and nonlinear behavior. Some of the above effects are reflected in existing coder algorithms, either by design or by accident. For example, certain forms of adaptive quantization and prediction systems provide efficient performance although they present inadequate response times. The slow response time can often be attributed to temporal noise masking. The basic time-frequency analyzers in the human perceptual chain are described as bandpass filters. Bandpass filters in perception are sometimes reflected in coder design and telecommunication practice in the form of "rules of thumb."

A particularly interesting aspect of the signal processing model of the human system is non-uniform frequency processing. The critical bands in vision are nonuniform. It is necessary to use masking models with a non-uniform frequency support to incorporate this in coder design. Here masking refers to the ability of one signal to hinder the perception of another within a certain time or frequency range. It is also necessary to recognize that high-frequency signals in visual information tend to have a short time or space support, while low-frequency signals tend to last longer. An efficient perceptual coder therefore needs to not only exploit properties of distortion masking in time and frequency, but also have a time-frequency analysis module that is sufficiently flexible to incorporate the complex phenomena of distortion masking by non-stationary input signals. All of this is in contrast to the classical redundancy-removing coder, driven purely by considerations of minimum mean square error (MMSE), MMSE bit allocation, or MMSE noise shaping matched to the input spectrum.

Distortion sensitivity profiles of human perception are driven as functions of frequency, brightness, texture, and temporal parameters. These four kinds of sensitivity are considered for gray scale video/images:

(1) Brightness sensitivity:

It was found that human visual perception is sensitive to luminance contrast rather than absolute luminance values. The ability of human eyes to detect the magnitude difference between an object and its background is dependent on the average value of background luminance. According to Web's Law, if the luminance of a test stimulus is just noticeable from the surrounding luminance, the ratio of just noticeable luminance difference to stimulus's luminance (Weber fraction) is almost constant. However, due to the ambient illumination failing on the display, the noise in dark areas tends to be less perceptible than that occurring in regions of high luminance. In general, high visibility thresholds will occur in either very dark or very bright regions, and tower thresholds will occur in regions of gray levels close to the mid-gray luminance, which is 127 for 8 bit sampling.

(2) Texture sensitivity:

The reduction in the visibility of stimuli due to the increase in spatial nonuniformity of the background luminance is known as texture masking. Several efforts have been made to utilize some forms of texture making to improve coding efficiency. In many approaches, visibility thresholds are defined as functions of the amplitude of luminance edge in which perturbation is increased until it becomes just discernible. The visibility threshold in this approach is associated with the masking function defined at each pixel as the maximum prediction error from the four neighboring pixels.

(3) Temporal sensitivity:

The masking of temporally changing stimuli is extremely important in interframe coding. However, temporal masking is complicated by many factors, and its application to video coding is still in its infancy. Many researches have attempted to evaluate the losses of spatial resolution and magnitude resolution as an object moves in a scene. If movement is drastic, such as scene change, the perceived spatial and intensity resolution is significantly reduced immediately after the scene change. It was found that the eye is noticeably more sensitive to flicker at high luminance than at low luminance.

(4) Frequency sensitivity:

Many psycho-visual studies have shown that the human perception of distortion depends on its frequency distribution. The response of the human visual system (HVS) to sine wave gratings of different frequencies has been experimentally measured as the so-called contrast sensitivity function (CSF). Many spatial-domain CSF models indicating general bandpass characteristics have been proposed. The spatial-domain CSF has been widely used to improve the quality of the coded still images. However, there are only a few models of spatio-temporal CSF reported. The spatio-temporal CSF provides relative sensitivities of the HVS to different spatio-temporal frequencies or relative tolerance of noises at different spatio-temporal frequencies. It can be used to allocate coding bits, or distortion, by adjusting the quantizer step size of the target signal as inversely proportional to the sensitivity of the corresponding frequency.

Perceptual Coding

There are two intrinsic operations to signal coding: removal of redundancy and reduction of irrelevancy. The removal of redundancy is the effect of predictive coding or transform coding. Almost all sampled signals in coding are redundant because Nyquist sampling typically tends to preserve some degree of inter-sample correlation. This is reflected in the form of a non flat power spectrum. Greater degrees of non-flatness, as resulting from a low-pass function for signal energy versus frequency, or from periodicities, lead to greater gains in redundancy removal. These gains are also referred to as prediction gains or transform coding gains, depending on whether the redundancy is processed in the spatial domain or in the frequency (or transform) domain.

The reduction of irrelevancy is the result of amplitude quantization. In a signal compression algorithm, the inputs of the quantizing system are typically sequences of prediction errors or transform coefficients. The idea is to quantize the prediction error, or the transform coefficients just finely enough to render the resulting distortion imperceptible, although not mathematically zero. If the available bit rate is not sufficient to realize this kind of perceptual transparency, the intent is to minimize the perceptibility of the distortion by shaping it advantageously in space or frequency, so that as many of its components as possible are masked by the input signal itself. The term perceptual coding is used to signify the matching of the quantizer to the human visual system, with the goal of either minimizing perceived distortion, or driving it to zero where possible. These goals do not correspond to the maximization of signal-to-noise ratios or the minimization of mean square error.

Just-noticeable-distortion (JND) Profile

To remove the redundancy due to spatial and temporal correlation and the irrelevancy of perceptually insignificant components from video signals, the concept of a just-noticeable distortion has been successfully applied to perceptual coding of video and image. JND provides each signal to be coded with a visibility threshold of distortion, below which reconstruction errors are rendered imperceptible. The JND profile of a still image is a function of local signal properties such as the background luminance and the activity of luminance changes in the spatial domain. For video sequences, the derivation of JND profiles must take both spatial and temporal masking effects into consideration. For a successful estimation of JND profiles, the subject should not be able to discern the difference between a video sequence and its JND-contaminated version.

The following papers are related to video transmission systems using the human visual model and are incorporated herein by reference:

"A Perceptually Optimized Joint Source/Channel Coding Scheme for Video Transmission over Satellite Broadcast Channel" Yimin Jiang, Junfeng Gu, and John s. Baras. (1999).

"A Video Transmission System Based on Human Visual Model for Satellite Channel", Junfeng Gu, Yimin Jiang, and John S. Baras.(1999).

Video Coding/Decoding System

A method according to an embodiment of the present invention will now be described with respect to FIG. 5.

The method begins at step 500. At a step 502 frame counter 200 is initialized by setting its value to zero. At a step 504 the video frames to be encoded are received by the human visual model based encoder 110. In a step 506 the frames count is increased in response to each received frame. In a step 508 two frames received in successive order are associated as a set in preparation for 3-D wavelet analysis. In a step 510 the 3-D wavelet analyzer module 210 performs decomposition of the video frame set into a multi resolution subband representation. In step 512 control is passed to the JND model generator 215.

3-D Wavelet Analysis

Wavelet multi resolution analysis techniques have been applied primarily to 1D and 2D signals. These techniques project the signal onto a chain of embedded approximation and detail spaces designed to represent the signal and its details at various levels of resolution. For practical purposes, the projection coefficients are obtained using a discrete subband transform that employs a quadrature mirror filter pair related to the type of wavelet used in the analysis. In conventional 2D wavelet multi-resolution analysis, the separable 2D approximation spaces are formed from the tensor product of identical 1 D approximation spaces. This restriction generates analyzing filters with homogeneous spectral characteristics in 2D frequency space. When extended to three dimensions, the multi-resolution analysis is constructed from a separable 3D analyzing or "scaling" function formed from the product of three nonidentical 1 D scaling functions, or two identical 1D spatial scaling functions and one different 1D temporal scaling function. This brings a much richer set of orthonormal basis vectors with which to represent 3D signals, and it produces filters that can be easily tailored to more closely match the spatial and temporal frequency characteristics of the 3D signal.

An $L_2 (\Re)$ multi-resolution analysis consists of a chain of closed, linear "approximation" spaces $V_j$ and a scaling function 0 which satisfy the following properties for all $f \epsilon L_2 (\Re)$ 1) $\ldots V_2 \subset V_{-1} \subset V_0 \subset V_1 \subset V_2 \subset \ldots$ 2)
$$\bigcup_{j \in Z} V_j = L_2(\Re); \bigcap_{j \in Z} V_j = \{0\}$$

3)
$$f(x) \in V_j \Leftrightarrow f(2x) \in V_{j+1}; j \in Z$$
$$f(x) \in V_j \Rightarrow f\left(x + \frac{n}{2^j}\right) \in V_j; n \in Z$$

4) The set of functions $$\left\{ 2^{\frac{j}{2}} f(2^j x - n) \big| j \hat{1} Z, n \hat{1} Z \right\}$$

forms an orthonormal basis for the approximation space $V_j$.

The purpose of multi-resolution analysis is to create a mathematical framework that facilitates the construction of a wavelet orthonormal basis for the space for all finite energy signals $L_2 (\Re)$. To this end, the orthogonal complement of V, in $V_{j:l}$ by $W_j$ where $$V_{j+1} = V_j \oplus W_j$$

and the symbol $\oplus$ indicates the direct sum is denoted. $W_j$ is typically referred to as the jth detail space, because it captures the difference in signal information between the approximation spaces $V_{j+l}$ and $V_j$.

It has been shown that one can create a mother wavelet $\Psi(x)$ such that the set of functions $$\left\{ 2^{\frac{j}{2}} \psi(2^j x - n) \big| n \in Z \right\}$$

forms an orthonormal basis for $W_j$. The spaces $W_j$, where j $\epsilon Z$, are mutually orthogonal; thus, by the denseness property of the multi-resolution analysis, the set of scaled and dilated wavelets $$\left\{ 2^{\frac{j}{2}} \psi(2^j x - n) \big| j \in Z, n \in Z \right\}$$

forms an orthonormal basis for $L_2 (\Re)$. The scaling functions and the mother wavelet are related by the "two-scale" recursion relations $$\phi(x) = \sum_{n=-\infty}^{\infty} h_n \sqrt{2\phi} \, (2x - n), \tag{14}$$

$$\psi(x) = \sum_{n=-\infty}^{\infty} g_n \sqrt{2\phi} \, (2x - n)$$

where $h_n$ and $g_n$ are the coefficients of the QMF pair which is used to compute the approximation and detail projection associated with $V_j$ and $W_j$ from the approximation at the next higher scale $V_{j+1}$.

Approximation and detail signals are created by orthogonally projecting the input signal f onto the appropriate approximation or detail space. Since each space is spanned by an orthonormal basis set, the signal projection onto a given approximation or detail space at the jth resolution, is equivalent to the sequence of projection coefficients obtained by the inner product operations $$a_{j,n} = \int_{-\infty}^{\infty} f(x) 2^{\frac{j}{2}} \phi(2^j - n) \, dx \tag{15}$$

$$d_{j,n} = \int_{-\infty}^{\infty} f(x) 2^{\frac{j}{2}} \psi(2^j - n) \, dx$$

where $a_{j,n}$ and $d_{j,n}$ represent the jth approximation and detail coefficients respectively.

Figure 6:
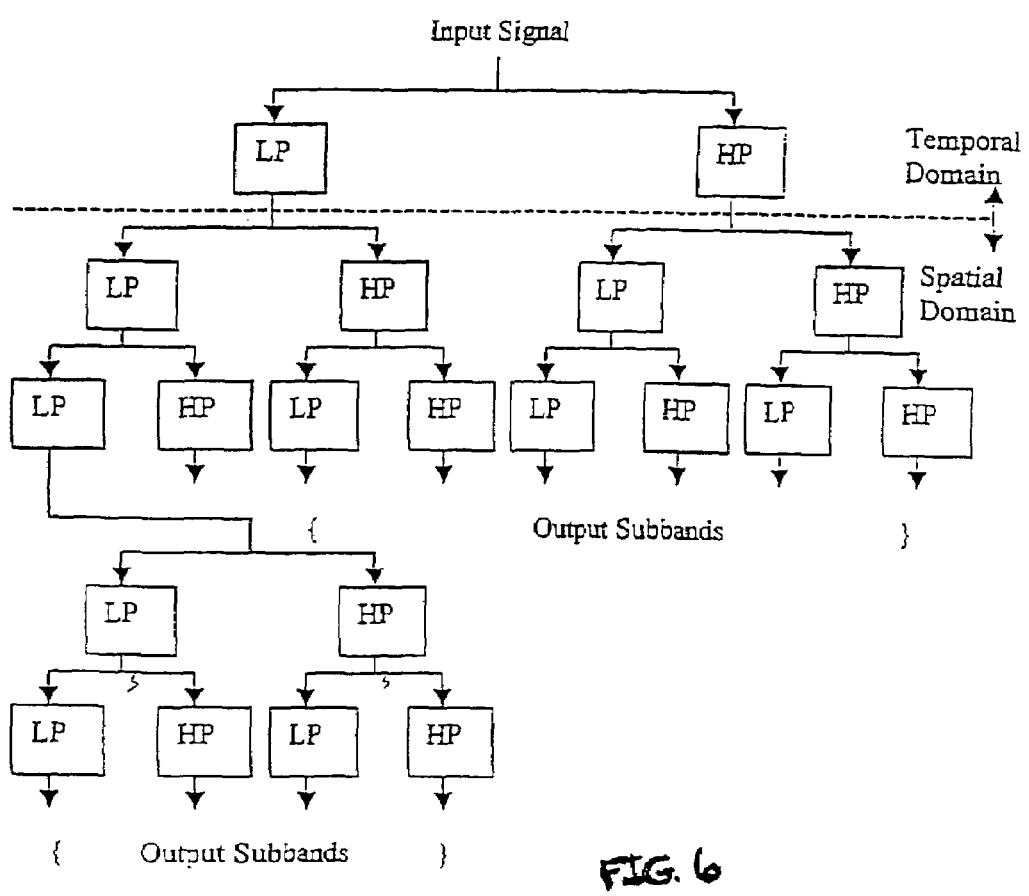
FIG. 6 is a block diagram illustration of 3-D wavelet decomposition.

FIG. 6 shows the block diagram of heterogeneous 3D wavelet decomposition. In this example, each video frame set is divided into 11 subbands. In one embodiment, the inventors use the simple two-tap Haar filter to separate the signal into temporal low frequency (LFP) and high frequency parts. (HFP) The low frequency part is then decomposed for two levels with the spatial 2-D wavelet decomposition and the high frequency part is decomposed for one level. The Antonini filter is used here. The Haar and Antonini filters work together to achieve a satisfying balance between complexity and performance.

The coefficients for the Antonini wavelet filter are:

For the LFP, the $h_n$ are given by {0.0378284555, 0.0238494650, 0.1106244044, 0.3774028556, 0.852698679, 0.3774028556, 0.1106244044. 0.0238494650, 0.0378284555}.

For the HFP, the $g_n$ are given by {0.0645388826, 0.0406894176, 0.4180922732, 0.788485616, 0.4180922732, 0.0406894176, 0.0645388826}.

JND Model Generation

The JND model provides each signal a threshold of visible distortion, below which reconstruction errors are rendered imperceptible. In this part, the spatial-temporal JND profile for each set of two frames in the video sequence and the JND profiles for subbands are generated sequentially.

Since the generation of the spatial-temporal JND profile for each frame requires one previous frame as reference, when a video sequence is being coded, the encoder has to assign the first frame a reference frame. In an embodiment of the present invention, the first frame in the video sequence will use itself as a reference to generate each renewed JND profile.

Figure 7:
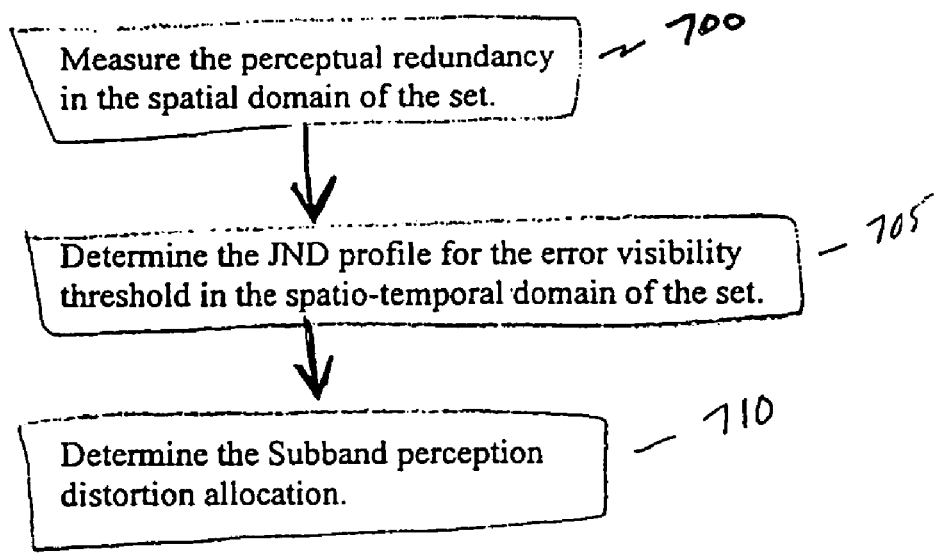
FIG. 7 illustrates a method of Just Noticeable Distortion model generation according to an embodiment of the present invention.

The generation of the JND model consists of several steps described in FIG. 7. First, in a step 700 the perceptual redundancy inherent in the spatial domain is quantitatively measured as a 2D profile by a perceptual model that incorporates the visibility thresholds due to average background luminance and texture masking. The following expression yields:

$$JND_S(x, y) = \max\{f_1(bg(x, y), mg(x, y)), f_2(bg(x, y))\},$$

$$\text{for } 0 \le x < W, 0 \le y < H \tag{1}$$

where $f_1$ represents the error visibility threshold due to texture masking, f the visibility threshold due to average background luminance; H and W denote respectively the height and width of the image; mg(x, y) denotes the maximal weighted average of luminance gradients around the pixel at (x, y); bg (x, y) is the average background luminance.

$$f_1(bg(x, y), mg(x, y)) = mg(x, y)\alpha(bg(x, y)) + \beta(bg(x, y)) \tag{2}$$

$$f_2(bg(x, y)) = \begin{cases} T_0 \cdot (1 - (bg(x, y)/127)^{1/2}) + 3 \\ \quad \text{for } bg(x, y) \le 127 \\ \gamma \cdot (bf(x, y) - 127) + 3 \\ \quad \text{for } bg(x, y) > 127 \end{cases} \tag{3}$$

$$\alpha(bg(x, y)) = bg(x, y) \cdot 0.0001 + 0.115$$

$$\beta(bg(x, y)) = \lambda - bg(x, y) \cdot 0.01 \text{ for } 0 \le x < H, 0 \le y < W$$

where $T_0$, $\gamma$ and $\lambda$ are found to be 17, 3/128 and ½ through experiments.

The value of mg(x, y) across the pixel at (x, y) is determined by calculating the weighted average of luminance changes around the pixel in four directions. Four operators, $G_k(I,j)$, for k=1, . . . 4, and I, j=1, . . . 5, are employed to perform the calculation, where the weighting coefficient decreases as the distance away from the central pixel increases.

$$mg(, x, y) = \max_{k=1,2,3,4}\left\{\left|\text{grad}_k (x, y)\right|\right\} \tag{4}$$

$$\text{grad}_k(x, y) = \frac{1}{16} \sum_{i=1}^{5} \sum_{j=1}^{5} p(x - 3 + i, y - 3 + j) \cdot G_k(i, j)$$

for $0 \le x < H$, $0 \le y < W$, where p(x, y) denotes the pixel at (x, y). The operators $G_k$(I, j) are $$G_1 = \begin{bmatrix} 0 & 0 & 0 & 0 & 0 \\ 1 & 3 & 8 & 3 & 1 \\ 0 & 0 & 0 & 0 & 0 \\ -1 & -3 & -8 & -3 & -1 \\ 0 & 0 & 0 & 0 & 0 \end{bmatrix}, G_2 = \begin{bmatrix} 0 & 0 & 1 & 0 & 0 \\ 0 & 8 & 3 & 0 & 0 \\ 1 & 3 & 0 & -3 & -1 \\ 0 & 0 & -3 & -8 & 0 \\ 0 & 0 & -1 & 0 & 0 \end{bmatrix},$$

-continued $$G_3 = \begin{bmatrix} 0 & 0 & 1 & 0 & 0 \\ 0 & 0 & 3 & 8 & 0 \\ -1 & -3 & 0 & 3 & 1 \\ 0 & -8 & -3 & 0 & 0 \\ 0 & 0 & -1 & 0 & 0 \end{bmatrix}, G_4 = \begin{bmatrix} 0 & 1 & 0 & -1 & 0 \\ 0 & 3 & 0 & -3 & 0 \\ 0 & 8 & 0 & -8 & 0 \\ 0 & 3 & 0 & -3 & 0 \\ 0 & 1 & 0 & -1 & 0 \end{bmatrix},$$

The average background luminance, bg(x, y), is calculated by a weighted lowpass operator, B(I, j), 1, j=1 . . . 5.

$$bg(x, y) = \frac{1}{32} \sum_{i=1}^{5} \sum_{j=1}^{5} p(x-3+i, y-3+j) \cdot B(i, j) \quad (5)$$

$$\text{where } B = \begin{bmatrix} 1 & 1 & 1 & 1 & 1 \\ 1 & 2 & 2 & 2 & 1 \\ 1 & 2 & 0 & 2 & 1 \\ 1 & 2 & 2 & 2 & 1 \\ 1 & 1 & 1 & 1 & 1 \end{bmatrix}$$

In a step 705, the JND profile representing the error visibility threshold in the spatio-temporal domain is determined according to the following expression:

$$JND_{S-T}(x,y,n) = f_3(ild(x,y,n)) \cdot JND_S(x,y,n) \quad (6)$$

where ild(x, y, n) denotes the average interframe luminance difference between the n th and (n−1) th frame. Thus, to calculate the spatio-temporal JND profile for each frame in a video sequence, the spatio JND profile of itself and its previous reference frame are required.

$$ild(x,y,n) = 0.5 \cdot [p(x,y,n) - p(x,y,n-1) + bg(x,y,n) - bg(x,y, n-1)]$$

$f_3$ represents the error visibility threshold due to motion. To purposely minimize the allowable distortion in the nonmoving area, the scale factor is switched to 0.8 as |ild(x, y, n)|<5. The inventors note that the error visibility threshold is increased with the increasing interframe luminance difference. This confirms the research findings that after a rapid scene change or large temporal difference, the sensitivity of the HVS to spatial details is decreased. Moreover, the inventors also found that temporal masking due to high-to-low luminance changes is more prominent than that due to low-to-high luminance changes.

After the spatio-temporal JND profile is determined in step 705, the JND profiles for each subband are set up with certain distortion allocation for different subbands in step 710.

The JND for a subband q is a function of spatio-temporal JND values at corresponding locations multiplied by a weight that indicates the perceptual importance of this subband. In the example provided in FIG. 6, the relationship between the full-band JND profile and the component JND profiles can be obtained by the following equations:

$$JND_q(x, y) = \left[ \left[ \sum_{i=0}^{3} \sum_{j=0}^{3} \sum_{t=0}^{1} JND_{S-T}^2(i + x \cdot 4, j + y \cdot 4, t) \right] \cdot \omega_q \right]^{1/2}, \quad (7)$$

for $0 \leq q \leq 3$, $0 \leq x < W/4$, $0 \leq y < H/4$ and $$JND_q(x, y) = \left[ \left[ \sum_{i=0}^{2} \sum_{j=0}^{1} \sum_{t=0}^{1} JND_{S-T}^2(i + x \cdot 2, j + y \cdot 2, t) \right] \cdot \omega_q \right]^{1/2}, \quad (8)$$

for $4 \leq q \leq 10$, $0 \leq x < W/2$, $0 \leq y < H/2$

The weighting function for distributing the full-band JND energy to a subband can be derived as the relative sensitivity of the HVS to the frequency subband. For example, with 11 spatio-temporal subbands, the weighting function of the qth subband, is obtained as $$\omega_q = \frac{S_q^{-1}}{\sum_{i=0}^{10} S_i^{-1}}, \text{ for } 0 \leq q \leq 10 \quad (9)$$

where $S_q$ represents the average sensitivity of the HVS to the qth subband. $S_q$ is obtained from the spatio-temporal CSF.

A Novel Human Perceptual Distortion Measure Based on JND

Based on the basic concept of the JND, the idea of minimally-noticeable-distortion (MND) is developed for situations where the bit-rate budget is tight and the distortion in the reconstructed image is perceptually minimal at the available bit-rate and uniformly distributed over the whole image. The perceptual quality of the reconstructed image is accordingly expected to degrade evenly if bit-rate is reduced. MND is expressed as:

$$MND(x, y) = JND(x, y) \cdot d(x, y) \quad (10)$$

where $0 \leq x \leq W$, $0 \leq y < H$, W and H are the width and height of an image respectively, d(x, y) is the distortion index at point (x, y).

The energy of JND can be understood as the minimum energy of quantization error that will cause conceivable loss to the human visual system. So, if the error in a small area is so small that the error energy is less than the JND energy, the compression will be perceptually lossless. The energy of the MND of a small area indexed by (I, j) is defined as:

$$\sum_{(x,y) \in r_{ij}} MND^2(x, y) \equiv \sum_{(x,y) \in r_{ij}} JND^2(x, y) \cdot \delta(i, j) \quad (11)$$

where $r_{ij}$, is a small block (typically 8 by 8 pixels), $\delta(I, j)$ is the distortion index for this block. The inventors define a global human perceptual distortion measure($\Delta_G$) based on evaluating $\delta(I, j)$ as follows:

$$\Delta_G \equiv \frac{1}{KL}\sum_{k=1}^{K}\sum_{l=1}^{L}\varepsilon(k,l) \qquad (12)$$

where $\epsilon(k, 1)$ is the distortion measure of a medium block indexed by (k, 1). The whole image is decomposed into K by L non-overlapped medium blocks ($R_{kl}$). Each medium block is divided into M by N small blocks ($r_{ij}$, (k, 1)), i.e., $$R_{kl} = \bigcup_{i=1,M;j=1,N} r_{ij}(k,l).$$

$\epsilon(k, 1)$ is defined as:

$$\epsilon(k,l) = median(\delta(i,j) r_{ij}(k,l) \epsilon R_{kl}, 1 \le i \le M, 1 \le j \le N) \qquad (13)$$

The larger $\Delta_G$ is the larger the subjective perceptual distortion is. Compared with PSNR or MSE, $\Delta_G$ has the same convenience to describe the picture quality with one quantitative value. However, $\Delta_G$ takes the human visual model into account and therefore reflects subjective visual quality better than PSNR or MSE. It is well accepted that the value of MSE or PSNR is meaningless to video/image subjective evaluation and when two images are compressed, the comparison of their MSE or PSNR values cannot give a creditable psycho-visual conclusion. On the other hand, the distortion $\Delta_G$ can be explained as "this image is compressed at a scale of $\Delta_G$ times the perceptually noticeable distortion." Generally speaking, if one image is coded with $\Delta_G$ larger than another one, the former's subjective quality is higher. Due to these considerations, the inventors use $\Delta_G$ as the index of performance for the video compression system.

Frame Counting & Motion Detection

The computation of the JND model is resource consuming for the real-time video system. Even if it is implemented with dedicated hardware, the reconstruction of the JND profile for each pair of incoming video frames is expensive and unnecessary. Thus, Frame Counter 200 & Motion Detector 205 are designed to control the JND renewal process.

Referring back to FIG. 5, in step 514 the frame counter 200 is used to count the number of frames being coded. After a certain number of frames have been coded with the current JND model, for example 10 or 20, control is passed back to step 512 so that the JND model can be refreshed. The inventors assume that the scenes depicted in the frames remain almost the same so the original JND model remains effective until the update. If, however, drastic movement or a scene cut happens, the scene changes greatly. If the scene changes, the original JND has to be refreshed right away to follow the change. This is why a motion detector is necessary. In the present embodiment, the inventors adopt a simple motion detection scheme. It considers two factors relative to picture content's change: a scene cut and drastic movement.

Figure 8:
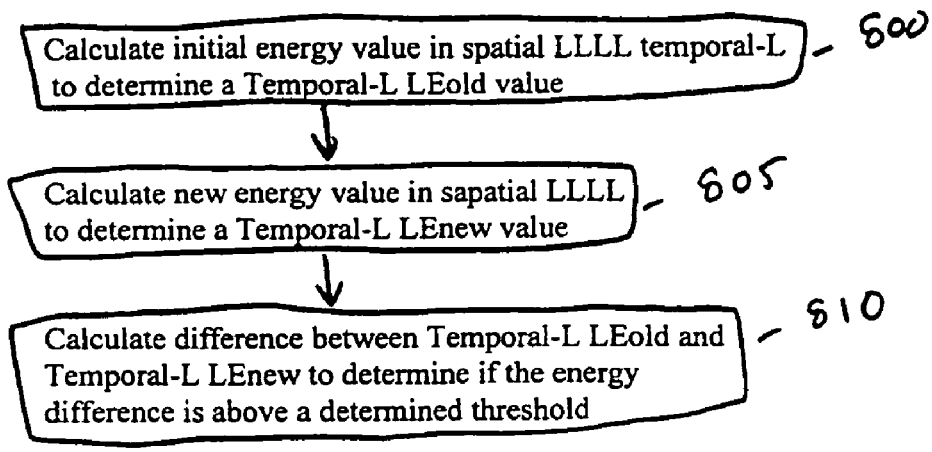
FIG. 8 illustrates a method of detecting a scene cut according to an embodiment of the present invention.

In a step 516 the detection of a scene cut is made in accordance with the process described in FIG. 8. In a step 800 the energy in the spatial-LLLL temporal-L subband is calculated for each set of two frames and stored as $LE_{old}$. In step 805 $LE_{new}$ is calculated for the next set of frames. In step 810 $LE_{old}$ is then compared with the new generated energy $LE_{new}$. If the difference exceeds a predefined threshold it is assumed that a scene cut has occurred and a new JND model will be generated. The appropriate threshold level is determined by the results obtained from sample calculations.

Figure 9:
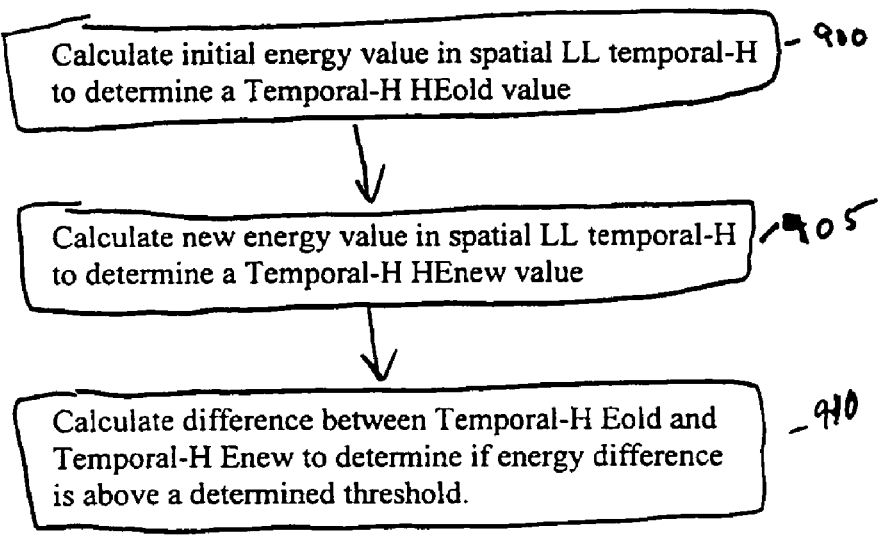
FIG. 9 illustrates a method of detecting drastic motion according to an embodiment of the present invention.

In a step 518 the detection of drastic movement is determined according to the process described in FIG. 9. In a step 900 the energy in the spatial-LL temporal-H subband is calculated. In a step 905 $HE_{new}$ is calculated for the next set of frames. In step 910 $HE_{old}$ is then compared with the new generated energy $HE_{new}$. If the difference exceeds a predetermined threshold it is assumed that drastic motion is occurring and a new JND model will be generated. The appropriate threshold level is determined by the results obtained from sample calculations.

At a step 520 the wavelet coefficients in the lowest frequency subbands (LFS) are encoded using differential pulse code modulation (DPCM). DPCM is a well known method for providing pixel value prediction error calculations.

At a step 522 control is passed to the perceptually tuned quantizer 220. Following the completion of step 522, inverse quantization is performed in a step 524. Upon completion of step 524 subband processing continues with steps 526 and 528. These steps can be performed in serial order or in parallel. Next, in step 530 perceptual channel coding is performed. Finally, in step 535 the encoded bitstreams are ready for transmittal. The above mentioned steps will now be discussed in greater detail with reference to additional figures where appropriate.

Perceptually Tuned Quantization

The perceptually tuned quantizer 220 is the core of the source encoder. With the JND profiles for each subband at hand, the most important task is to allocate the available bits to certain coefficients obtained from the wavelet decomposition as efficiently as possible. The beauty of JND is that it provides a quantitative measure of the error sensitivity threshold with spatial and frequency localization. In schemes using DCT like MPEG-2, the DCT coefficients are quantized using a quantization table that assigns more bits to the more important lower frequency coefficients in one 8 by 8 block. Although such a table is designed according to the HVS response based on psychovisual theory and experiments, its wide use all over the whole picture brings shortcomings because different parts in a picture can have different visual importance at different scenes. In comparison, using a quantization table based on JND that can adapt itself to local scenes' results in less perceptual distortion.

The symbol $\Delta_G$ used here is the same symbol used to indicate the new JND based human perceptual distortion measure since both have the same psychological meaning. Ideally, the coding procedure controlled by the object global distortion index $\Delta_G=d$ will produce a compressed video sequence whose average perceptual distortion index $\Delta_G$ value is d'=f(d). The powerful functionality to control the compressed video quality ahead of time distinguishes this scheme from conventional video coding systems. In addition, the coding distortion is perceptually evenly distributed across the whole image.

Uniform Quantization

Figure 10:
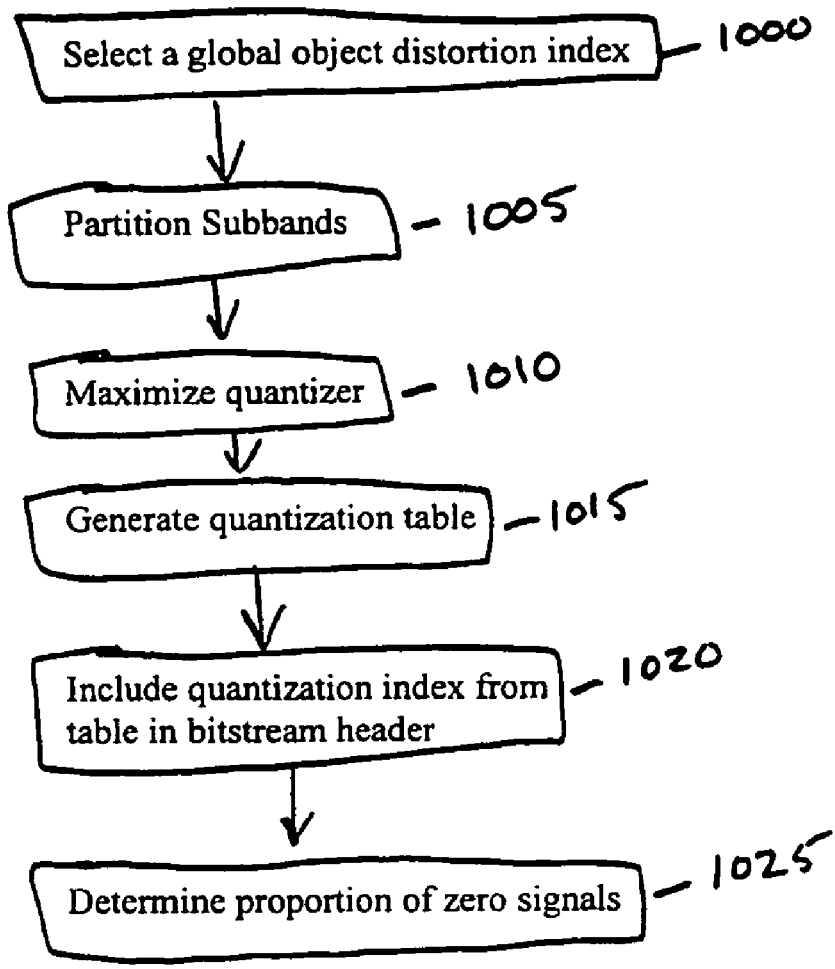
FIG. 10 illustrates a quantization method according to an embodiment of the present invention.
Figure 11:
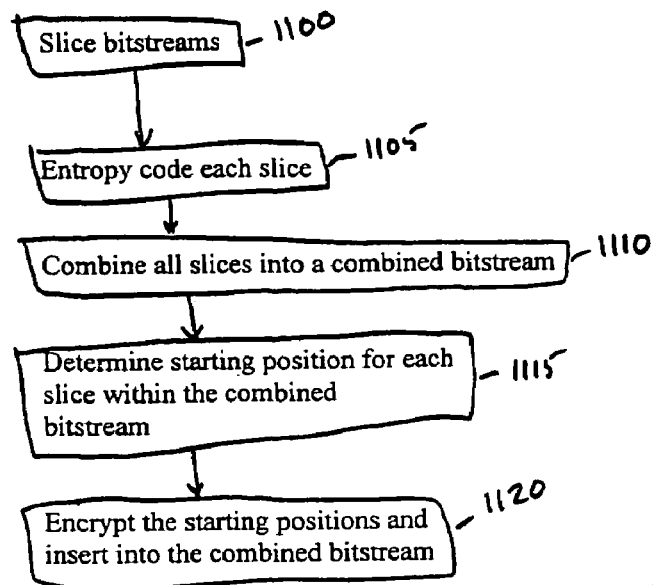
FIG. 11 illustrates a method of encoding low frequency subbands according to an embodiment of the present invention.

In one embodiment, a mid-rising uniform quantizer is used due to its simplicity of error analysis and its sound performance under certain conditions for optimality. FIG. 10 illustrates a quantization method according to an embodiment of the present invention. In a step 1000 a global distortion index $\Delta_G$ is given for the quantization procedure. The global distortion index ranges from approximately 1.0 to 10.0, where 1.0 stands for just noticeable distortion. In step 1005 each subband is partitioned into non-overlapped blocks ($r_{ij}(k, I)$). These blocks are set up with the size of 8×8 or 16×16. In step 1010, for each block $r_{ij}(k, l)$, the step size of the mid-rising uniform quantizer is maximized under the condition that the quantization error energy is less than or equal to the MND energy in the block that has the distortion index δ1, j) equal to $\Delta_G$, i.e.

$$\max_{\tau_{ij}(k,l)} \arg \left| \sum_{(x,y)\in r_{ij}(k,l)} MND^2(x, y) \geq \sum_{(x,y)\in r_{ij}(k,l),|w(x,y)|<\tau_{ij}(k,l)} + \sum_{(x,y)\in r_{ij}(k,l),|w(x,y)|\geq\tau_{ij}(k,l)} [w(x, y) - \hat{w}(x, y)]^2 \right| \quad (16)$$

where the energy of MND defined as equation (11), w(x, y) is the wavelet coefficient, $\hat{w}(x, y)$ is the quantized wavelet coefficient, $r_{ij}(k, 1)$ is the quantization step size of $r_{ij}(k, I)$.

In a step 1015, one quantization table that leads to the uniform error energy distribution over all subbands is set up for each subband. In a step 1020, the quantization index values from the quantization table are transmitted in the header of the bit stream for this subband. In a step 1025 a determination of the proportion of zero signals in a block is made to determine if after the quantization, the proportion of zero signals in the block is larger than a specified threshold, for example ⅞ or 15/16. If so, this block is assumed to be unimportant. Accordingly, its step size is recorded as 0. The coefficients in such an unimportant block need not be transmitted. As a result, in the decoder all values in this block are recovered as 0's.

When the bandwidth is dynamically assigned to this source encoder. $\Delta_G$ can be kept constant to maintain the video quality at the same level. If the bandwidth is fixed, i.e., the bit rate is limited for this source encoder, several $\Delta_G$ values should be calculated and the corresponding bit rates compared with the available channel capacity. One $\Delta_G$ value that provides proper bit rate will be chosen finally. The procedure for refreshing the quantization table and $\Delta_G$ value choice is repeated when the Frame Counter reaches a certain number or a drastic movement happens, resulting in the need to update the JND model.

Lloyd-Max Quantizer

In an alternative embodiment, an optimum mean square error quantizer is used. This quantizer minimizes the mean square error for a given number of quantization levels. For a random variable u, the reconstruction levels $a_k$ are calculated according to the expression [31]

$$a_k = \frac{\int_k^{k+1} u p_u(u) du}{\int_k^{k+1} p_u(u) du} \quad (17)$$

where $p_u(u)$ is the continuous probability density function of the random variable u, and $t_k$ is the transition level $$t_k = \frac{(a_k + a_{k+1})}{2} \quad (18)$$

To design an appropriate quantizer, the distribution of the subband samples needs to be known. It has been suggested that the probability density function of the subband values and their prediction errors is Laplacian. Although more accurate probability distribution of the subband values, i.e., generalized Gaussian distribution, has been suggested and its shape parameters estimation method is explored, the resulting overhead for the calculation and transmission of the parameters is too large. So the inventors use the Laplacian distribution as a reasonable approximation.

According to the quantization procedure of an alternative embodiment, the first step selects a global object distortion index $\Delta_G$. Second, the variance of the wavelet coefficients for each subband is calculated. Next, all the coefficients are unified. Fourth, each subband is partitioned into blocks ($r_{ij}(k, I)$) with size of 8 by 8 or 16 by 16. For each block $r_{ij}(k,I)$ the levels of Lloyd-Max quantizer are minimized under the condition that the quantization error energy is less than or equal to the MND energy in this block that has the distortion index δ(I, j) equal to $\Delta_G$, i.e., $$\min_n \arg \left| \sum_{(x,y)\in r_{ij}(k,l)} MND^2(x, y) \geq \sum_{(x,y)\in r_{ij}(k,l),|w(x,y)|<t_1^{(n)}} + \sum_{(x,y)\in r_{ij}(k,l),|t_{m+1}^{(n)}>|w(x,y)|\geq t_m^{(n)},m=1,2,\ldots,N} [w(x, y) - a_m^{(n)}(x, y)]^2 \right| \quad (19)$$

where the energy of MND is defined as in equation (11), w(x, y) is the wavelet coefficient, n is the number of quantizer levels with n=3,5, . . . . 2N+1, 2N+J is the maximal number of quantization levels, m indicates the interval in which w(x, y) is located, and $\alpha_m^{(n)}(x, y)$ is the quantized wavelet coefficient for a quantizer with n levels. Here a look-up table is set up for the $t_m^{(n)}$ and $\alpha_m^{(n)}$ since the wavelet, coefficients for quantization have been unified. The index of levels for the optimum quantizer is transmitted in the header of the bit stream of this subband.

Referring back to FIG. 5, in a step 524 the subbands go through inverse quantization to correct errors occurring during the quantization process. At the conclusion of step 524 control is then passed to the slicing and arithmetic coding modules.

Arithmetic Coding and Slicing

The arithmetic coding scheme developed by Witten, Neal and Cleary is widely used in video codecs due to its superior performance. It easily accommodates adaptive models and is computationally very efficient. The arithmetic coding scheme provides efficient compression, however the decoding result of one coefficient depends on the decoding result of the previous one because of the adaptive coding procedure employed.

Theoretically, arithmetic coding encodes a message as a number in the unit interval. Unlike most schemes, including Huffman Coding, there is no specific code word defined for any specific symbol, but how each symbol is encoded depends, in general, on the previous symbols of the string. For the source sequence $x_n$, let $p(x^n)$ denote its probability mass function and F(x) its cumulative distribution function. A number in the interval ($F(x^n)-p(x^n)$, $F(x^n)$) can be used as the code for $x^n$. For example, expressing $F(x^n)$ to an accuracy of $\lceil -\log p(x^n) \rceil$ will yield a uniquely decodable code for the source. However this is equal to the entropy of the message encoded, so that by Shannon's theory the theoretical bound has been achieved. There are two reasons why the theoretical bound cannot usually be achieved in practice:

(1) For a message of unbounded length, arithmetic of unbounded precision is required for maintaining the value of the current interval. In practice this is overcome by scaling procedures which add to the average encoded word length by decreasing the size of the actual interval calculated.

(2) The decoding is not unique unless the length of the message is known, since a single point may represent any interval of which it is a member. Without knowledge of the message length, decoding can proceed indefinitely. This may be overcome in practice either by sending a length indicator or by using an end-of-message symbol. Both of these add overhead to the encoding.

In the sequential encoding procedure, each symbol in the message is assigned a half-open subinterval of the unit interval of length equal to its probability. This is referred to as the coding interval for that symbol. As encoding proceeds a nesting of subintervals is defined. Each successive subinterval is defined by reducing the previous subinterval in proportion to the length of the current symbol's coding interval. This process continues until all symbols have been encoded.

In some cases a precise probability distribution for the source is unavailable. In these cases, a dynamical procedure of updating the symbol frequency model, which renders removal of the redundancy quite efficiently, will be used to adapt to the source. This is the basic idea of adaptive arithmetic coding.

Dependency of Arithmetic Coding

In arithmetic coding, the source sequence $x^n$ is represented by its cumulative distribution function $F(x^n)$. The encoding output of the current symbol depends on the previous one due to the tree-structured encoding procedure. So basically, it is a polyalphabetic cryptosystem. With the knowledge of a source symbol frequency model, the decoder restores the source symbol one by one with successive dependency. This dependency is observed in the following examples. In this implementation, a binary bit stream is obtained as the encoding output.

EXAMPLE 1

Assume the source symbol frequency model is $$\begin{bmatrix} 0 & 1 & 2 \\ 0.3 & 0.3 & 0.4 \end{bmatrix}$$

which indicates that Prob(symbol=0) is 0.3, Prob(symbol=1) is 0.3. Prob(symbol=2) is 0.4. The source sequence for AC encoding is
1 1 1 2 0 2 0 1 0 1 0 1 2 2 1 0 0 2 1 0

The encoded binary bit stream is
10010000 10010001 01000110 11100100 11 (34 bits)

Here the frequency model doesn't match the distribution of source sequence. But it only decreases the compression ratio and doesn't change the characteristics of AC. If the third symbol 1 is replaced by 2 and 0 respectively, the encoder will give out the corresponding binary bit stream
10001000 00011000 10011011 01000101 1 (33 bits) and
10010111 01111010 11010100 01100011 00 (34 bits)

Only a few bits in the front are the same in these three cases. The numbers of output bits are also different, i.e., the change of the previous symbol changes the encoding of the following symbols completely.

The loss of source symbol also diversifies the encoding of the following symbols. If the sequence of source symbols is
1 1 2 0 2 0 1 0 1 0 1 2 2 1 0 0 2 1 0

(with the first symbol lost), it's encoded to
10001100 10010000 10000101 01011111 (32 bits)

EXAMPLE 2

Assume the same symbol frequency model as that in the previous case.

The sequence of symbols for encoding is
1 2 2 0 2 0 1 0 1 0 1 2 2 1 0 0 2 1 0 1

The encoding output is
01110000 01010011 10110001 11110010 01 (34 bits)

Suppose there is one bit (7th bit) error in the bit stream, which turns it into
01110010 01010011 10110001 1111001001.

Then the decoded symbol sequence is
1 2 2 0 0 1 0 0 2 2 1 0 2 0 2 2 2 0 2 0

The symbols after the 3rd one are totally different from the original symbols.

If the decoder erroneously locates the start bit position in the bit stream, the following symbols cannot be decoded correctly since in both cases the decoding path in the tree structure is misled.

Input symbol sequence:
1 2 2 0 2 0 1 0 1 0 1 2 2 1 0 0 2 1 0 1

Output bit stream after encoding:
01110000 01010011 10110001 11110010 01 (34 bits)

1 bit left shift:
11100000 10100111 01100011 11100100 1

Output symbol sequence after decoding:
0 1 1 0 2 0 1 2 2 2 2 1 1 2 0 1 2 1 2 1

1 bit right shift:
00111000 00101001 11011000 11100001 001

Output symbol sequence after decoding:
2 1 1 2 0 2 0 2 1 2 0 0 1 0 2 1 2 1 1 2

From these examples we can see that even with a fixed frequency model, the correctness of encoding/decoding of the previous symbol dominantly decides the correctness of the following one. In the environment of a noisy channel the possibility for decoding errors is increased. In order to prevent the decoding errors from spreading, the inventors derived a slicing algorithm to truncate the whole subband into short bit streams before arithmetic coding.

The inventors also recognized the importance of knowing the precise location of the start bit of an AC encoded bit stream and thus, developed a conditional access sub-system based on this property.

Conditional Access with Arithmetic Coding

Figure 5:
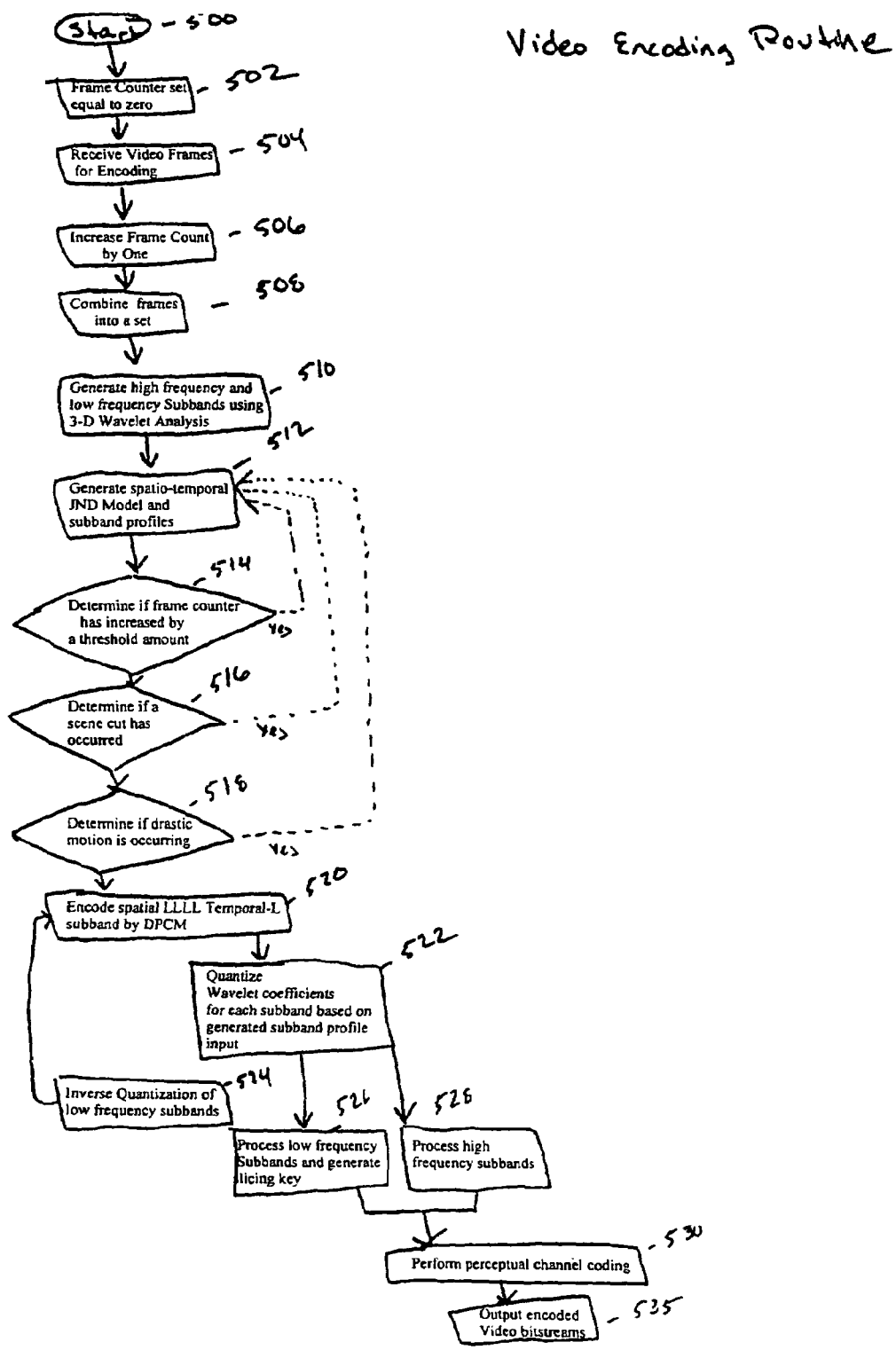
FIG. 5 illustrates a method of encoding and decoding data transmitted over a broadcast network according to an embodiment of the present invention.

Referring to FIG. 5, step 526 is directed to the processing of the low frequency subbands in accordance with a conditional access scheme. The conditional access process beginning at step 526 will now be discussed with respect to FIG. 11. First, in step 1100 the data frame being processed for transmission is broken into slices $\{s_1, s_2, \ldots s_M\}$ The locations of breaking points are decided by a randomly generated vector v. This vector v is updated after a short time interval. Next, in step 1105 each slice is entropy encoded respectively into bit stream $\{b_1, b_2, \ldots b_M\}$. In an embodiment of the present invention, arithmetic coding is relied upon. In step 1110, these bit streams are concatenated into one bit stream $b_{total}$. In step 1115, the function l(b) is assigned to represent the length of bit stream b and the value $$\sum_{k=1}^{i-1} l(b_k)$$

is used to determine the start bit positions of $b_i$, I=1, 2, ... M, in $b_{total}$. In step 1120, the values of $l(b_i)$ (i.e. the scrambler key κ) are encrypted into ECM using any available encryption algorithm and inserted into the header of this data frame and transmitted.

For the illegal user, cryptanalysis of such a bit stream will be almost computationally impossible in the broadcasting case, even if the only thing unknown to him is the $l(b_i)$ values. Assume that the frame size is 352×288. If each frame is wavelet decomposed in 2 levels, the most important subband LLLL (LFS), which actually needs encryption, has the size of 88×72. These coefficients are quantized and organized into 8×8 non-overlapped blocks which yields 11×9 blocks totally. Suppose these 99 blocks are broken into 11 slices for random AC There will be $$\binom{98}{10} = 1.4 \times 10^{13}$$

schemes to choose. Only if the illegal user decides these slice lengths in the procedure of decoding, can he know when he has got enough symbols for the current slice. At this point he should stop the current AC amount of possibilities in deciding slice locations eliminates the feasibility of the method of "making mistakes and trying", i.e., the key space is large enough to stop the real-time decryption of the data in commercial broadcasting.

In an alternative embodiment, an adaptive source symbol frequency model will be used, no fixed source symbol frequency model is made available and the frequency model is dynamically updated along with the coding procedure. Thus, the AC encoding and decoding of the symbol depends more tightly on the previous one. Even if the illegal user gets the correct start position of bi, 1=1,2, ... ,M, he cannot decode it without knowing the NoS (number of symbols), which is vital for setting up the adaptive model and variable in different slices. The NoS will also be encrypted and transmitted in the frame header. For the wavelet coefficients in the video coding system, the data range differs frame by frame, so the illegal user cannot know it a priori.

As previously explained, the wavelet coefficients in the lowest frequency subbands contain the most important information. Thus, in one embodiment, only the LFS subbands are processed through the conditional access system. The high frequency subbands are simply sliced at fixed locations and arithmetically encoded.

High Frequency Subband Slicing

Figure 12:
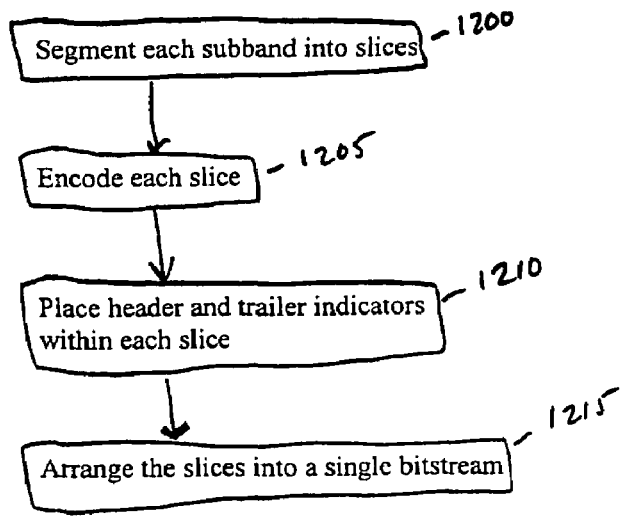
FIG. 12 illustrates a method of encoding high frequency subbands according to an embodiment of the present invention.
Figure 13:
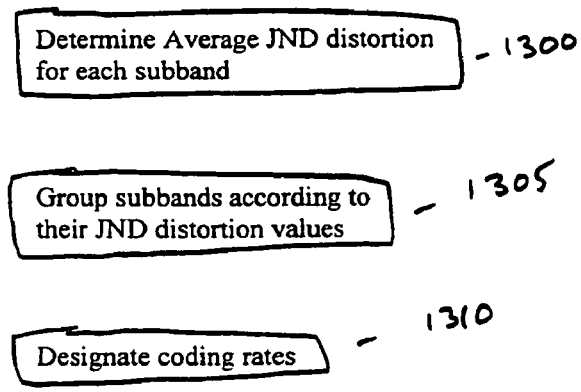
FIG. 13 illustrates a method of channel coding according to an embodiment of the present invention.

Referring again to FIG. 5, the high frequency subband processing step 528 will now be discussed with respect to FIG. 12. The idea here is to generate small bitstreams that carry the same amount of "distortion sensitivity". In a step 1200 the high frequency subband S, is segmented into I short bit streams. Here, the inventors define I sets $G_i$ of the point (x, y), such that for each set G, $$(i = 1, \ldots, I): S_l = \bigcup_i G_i \text{ and}$$

$$G_i = \left\{ (x, y) \middle| \sum_{(x,y) \in G_i} \frac{1}{JND^2(x, y)} = \frac{1}{I} \sum_{(x,y) \in S_l} \frac{1}{JND^2(x, y)}, \right. \quad (20)$$
$$(x, y) \in S_l, (x, y) \notin G_j, j \neq i \right\}$$

so every time when such a short bit stream is being encoded, a new adaptive statistical model, is set up for it. In a step 1205 the slices are entropy coded using arithmetic coding, for example. In a step 1210, header and trailer symbols are added to the slices so each slice is capable of being selected out from the received bit stream at the decoder side. In a step 1215 the encoded slices are merged into one bit stream. The slicing information is then transmitted along with the data stream.

Arithmetic coding is a powerful entropy coding scheme for data compression. It is a promising replacement to Huffman coding in video broadcasting systems because of its superior performance. The combination of AC with the conditional access subsystem according to an embodiment of the present invention provides an encryption solution at low cost. The illegal user who tries to break the AC based conditional access system faces these problems: (1) The positions of slices $\{b_1, b_2 \ldots b_M\}$ in the concatenated bit stream are unknown so, they cannot be picked out for decoding. (2) The number of symbols in the adaptive source symbol frequency model is unknown thus creating ambiguity in the decoding. (3) Certain $b_i$, 1=1,2, ... ,M, in the concatenated bit stream are encrypted with probability p<1. Such a mixture of cipherdata and plaindata brings more difficulties to cryptanalysis. Once slicing and arithmetic coding has been applied to the bitstreams, control is passed to channel coder 115 for further processing.

Perceptual Channel Coding

Referring again to FIG. 5, the next step is to perform perceptual channel coding, as shown at step 530. While compression serves to reduce the amount of bits used to represent bitstream data, channel coding works to expand or increases the length of the bitstream. In the video arena, under bad transmission conditions, such as noisy lines, for example, bitstream data can be lost, resulting in poor video quality. The percentage of data lost can be calculated. Channel coding seeks to protect important bits by adding non-important bits to the bitstream. The goal is for the non-important bits to make up the greater amount of bits represented in the lost data percentage, thus allowing the more important bits to be successfully transmitted. In one embodiment of the present invention, rate compatible punctured convolutional (RCPC) codes are added. The advantage of using RCPC codes is that the high rate codes are embedded into the lower rate codes of the family and the same Viterbi decoder can be used for all codes of a family. Reed-Solomon code and Ramsay interleaver plus RCPC is used to protect the data from spatial LLLL temporal L subband. Cyclic redundancy check (CRC) codes are combined with RCPC for other less significant subbands to assure acceptable video quality even under bad channel conditions. In order to optimize the overall subjective video quality at a reasonable coding cost, a rate allocation scheme based on JND distortion will now be described with reference to FIG. 13.

In a step 1300, the average JND distortion of subband I (for example 11=0, . . . ,10) is determined as follows:

$$D_l = \frac{1}{H_l W_l} \sum_{(x,y) \in S_l} JND(x, y)^2 \tag{21}$$

where $S_l$ is the set of pixels of subband l, $H_l$ and $W_l$ are height and weight of it separately. $D_l$ is an indication of the robustness of $S_l$ to errors. The larger $D_l$ is, the more robust it is to errors, thus a higher coding rate is chosen. FIG. 15 shows the D, values for a sample video sequence.

In a step 1305, the subbands are arranged into groups based upon their calculated D, values. Any classification algorithm known to one of ordinary skill in the art can be used to determine the groups. With 11 subbands for example, the division of S, could result in three categories $\{S_0\}, \{S_1 S_2, S_3, S_4 S_5, S_7\}\{S_8, S_9\}, \{S_{10}\}$ as shown in FIG. 15. Finally, in a step 1310, the subbands are assigned different RCPC coding rates according to their levels of importance. The degree of importance is based upon the sensitivity to error associated with the subband in terms of the human visual model.

Upon completion of step 1310 the low and high frequency bitstreams are ready for transmission.

Video Decoder and Error Concealment

Figure 14:
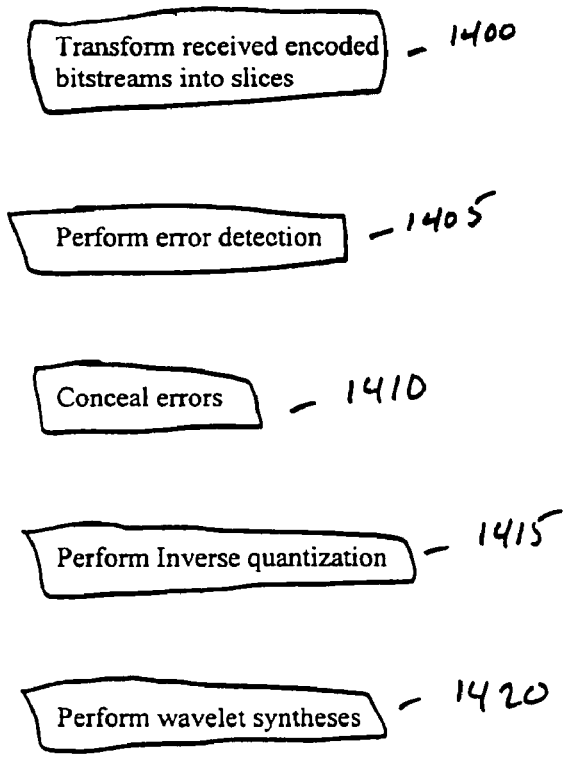
FIG. 14 illustrates a method of decoding a video transmission according to an embodiment of the present invention.

The functionality of the modules in the video decoder are described with respect to FIG. 14. In a step 1400, decoder 400 processes the encoded bitstreams to produce slices of wavelet coefficients. Any well known decoding process equivalent to the encoding process, for example, arithmetic decoding, can be used. In a step 1405 error detector 405 determines if any of the slices contain coding errors. Any well known error detecting method, for example CRC, can be used. In a step 1410, the error concealment module 410 discards those slices where errors are detected. At times, no error is detected, although there are some errors in the received slice. However, Decoder 400 can be used to detect conflicts during decoding thereby identifying previously undetected errors. In this case, coefficients in the corrupted slice are retrieved from its DPCM reference if it belongs to the spatio-LLLL temporal-L subband. If the slice belongs to subbands of higher frequency, the coefficients are set to zero's since the error effect is trivial and will be confined within the slice. In the worst case where errors are not detected, they will not spread to the whole subband due to slicing.

In the MPEG system, decoding error is also confined within slices. But the corruption of data will destroy the whole slice thoroughly. In the wavelet-based system of the present invention, even if slices in one subband are corrupted, slices in other subbands will contribute to the same area of the frame.

In a step 1415 inverse quantization is applied to the slices. In a final step 1420 the slices are put through a wavelet synthesizing process resulting in the presentation of viewable video frames in step 535.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method, comprising:
    (a) arranging two successively received video frames into a set;
    (b) decomposing said set into a plurality of high frequency and low frequency subbands;
    (c) generating a human perceptual model for each of the plurality of subbands;
    (d) encoding said low frequency subbands to produce encoded low frequency subbands;
    (dd) inverse quantizing said encoded low frequency subbands:
    (e) quantizing said high frequency subbands and said low frequency subbands according to said generated human perceptual models to generate bitstream for each of said high frequency subbands and a bitstream for each of said low frequency subbands;
    (f) redefining said generated bitstreams for each of said high frequency subbands to produce a plurality of redefined high frequency bitstreams;
    (g) redefining said generated bitstreams for each of said low frequency subbands to produce a plurality of redefined low frequency bitstreams;
    (h) channel coding said plurality of redefined high frequency bitstreams and said plurality of redefined low frequency bitstreams; and
    (i) repeating steps (a)–(h) for a next set until each of said received video frames have been compressed.

2. The method of claim 1 wherein a frame counter is advanced as each one of said plurality of video frames is received.

3. The method of claim 1 wherein before said quantizing step (e) a scene cut determination is made, comprising:
    (i) calculating a temporal-L energy level for said set and storing said result as $LE_{old}$;
    (ii) calculating a temporal-L energy level for a next set and storing said result as $LE_{new}$;
    (iii) calculating a difference between said $LE_{new}$ and $LE_{old}$ values and if said difference is above a determined threshold then generating a new human perceptual model; and
    (iv) saving said $LE_{new}$ value as $LE_{old}$.

4. The method of claim 1 wherein before said quantizing step (e) a drastic motion determination is made, comprising:
    (i) calculating a temporal-H energy level for said set and storing said result as $HE_{old}$;
    (ii) calculating a temporal-H energy level for a next set and storing said result as $HE_{new}$;
    (iii) calculating a difference between said $HE_{new}$ and $HE_{old}$ values and if said difference is above a determined threshold then generating a new human perceptual model; and
    (iv) saving said $HE_{new}$ value as $HE_{old}$.

5. The method of claim 2 wherein a new human perceptual model is created each time said frame counter advances a determined number of times.

6. The method of claim 1 wherein said set is decomposed using 3-D wavelet analysis.

7. The method of claim 1 wherein said human perceptual model is generated based upon a just-noticeable distortion profile.

8. The method of claim 7 wherein said just-noticeable distortion profile based human perceptual model is used to generate a minimally-noticeable distortion profile.

9. The method of claim 1 wherein said low frequency subbands are encoded using differential pulse code modulation.

10. The method of claim 1 wherein said quantizing step (e) comprises:
   (i) selecting a global object distortion index;
   (ii) calculating a wavelet coefficient value for each of said subbands;
   (iii) unifying said calculated wavelet coefficient values;
   (iv) partitioning each of said subands into non-overlapping blocks;
   (v) for each block, minimizing a quantizer level such that a quantization error energy value is less than or equal to a determined energy value for said minimally-noticeable distortion profile of said block having a distortion index equal to said global object distortion index;
   (vi) generating a quantization table based on said minimizing results; and
   (vii) copying an index range corresponding to said quantization table into each of said generated bitstreams.

11. The method of claim 1 wherein said quantizing step (e) comprises:
   (i) selecting a global object distortion index;
   (ii) partitioning each of said subbands into non-overlapping blocks;
   (iii) for each block, maximizing a quantizer level such that a quantization error energy value is less than or equal to a determined energy value for said minimally-noticeable distortion profile of said block having a distortion index equal to said global object distortion index;
   (iv) copying said maximized quantizer levels into a header portion of said bitstream corresponding to each subband; and
   (v) determining if a proportion of zero signals in said blocks exceed a determined threshold.

12. The method of claim 1, wherein for each of said generated bitstreams corresponding to said high frequency subbands, said plurality of redefined high frequency bitstreams are produced according to the following steps:
   (i) dividing said generated bitstream according to said corresponding generated human perceptual model to produce a plurality of high frequency slices,
   (ii) entropy coding said plurality of high frequency slices,
   (iii) adding a header symbol indicating a starting point for each of said high frequency slices and a trailer symbol indicating an ending point for each of said high frequency slices to each of said plurality of high frequency slices; and
   (iv) arranging said plurality of high frequency slices to produce a redefined high frequency bitstream for each subband.

13. The method of claim 1, wherein for each of said generated bitstreams corresponding to said encoded low frequency subbands, said plurality of redefined encoded low frequency bitstreams are produced according to the following steps:
   (i) dividing said generated bitstream at randomly selected points to produce a plurality of low frequency slices,
   (ii) entropy coding said plurality low frequency slices,
   (iii) arranging said entropy coded low frequency slices to produce a redefined low frequency bitstream for each subband,
   (iv) determining a bit start position value for each of said entropy coded low frequency slices included in said redefined low frequency bitstream,
   (v) encrypting each of said bit start position values, and
   (vi) inserting said encrypted bit start position values into a header of said redefined low frequency bitstream.

14. The method of claim 1 wherein said plurality of low frequency bitstreams and said plurality of high frequency bitstreams are entropy coded using arithmetic coding.

15. The method of claim 1 wherein said channel encoding comprises:
   (i) calculating an average just-noticeable distortion value for each of said plurality of subbands;
   (ii) associating each of said plurality of subbands having approximately the same average just-noticeable distortion value into a plurality of subband groups; and
   (iii) assigning rate compatible punctured convolutional codes to each of said encoded bitstreams for each subband within said subband groups according to a determined significance for each of said plurality of subbands.

* * * * *